(12) United States Patent
Wirkowski et al.

(10) Patent No.: US 9,103,458 B2
(45) Date of Patent: Aug. 11, 2015

(54) METHOD AND DEVICE FOR CONTROLLING A VALVE

(75) Inventors: Michael Wirkowski, Regensburg (DE); Rainer Weber, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 434 days.

(21) Appl. No.: 13/701,598

(22) PCT Filed: May 30, 2011

(86) PCT No.: PCT/EP2011/058838
§ 371 (c)(1),
(2), (4) Date: Feb. 11, 2013

(87) PCT Pub. No.: WO2011/151288
PCT Pub. Date: Dec. 8, 2011

(65) Prior Publication Data
US 2013/0134335 A1 May 30, 2013

(30) Foreign Application Priority Data
Jun. 2, 2010 (DE) .......................... 10 2010 022 536

(51) Int. Cl.
*F16K 31/00* (2006.01)
*F02D 41/24* (2006.01)
(Continued)

(52) U.S. Cl.
CPC ................ *F16K 31/00* (2013.01); *F02D 41/20* (2013.01); *F02D 41/2464* (2013.01);
(Continued)

(58) Field of Classification Search
CPC ......................... F02D 41/20; F02D 2041/2037

USPC .................................................. 123/479, 490
See application file for complete search history.

(56) References Cited

U.S. PATENT DOCUMENTS

| 4,823,825 A * | 4/1989 | Buchl .............................. 137/1 |
| 5,182,517 A | 1/1993 | Thelen et al. ................. 324/418 |

(Continued)

FOREIGN PATENT DOCUMENTS

| CN | 101405503 B | 7/2012 | ............. F02D 41/30 |
| DE | 3942836 A1 | 6/1991 | ............. F02D 41/20 |

(Continued)

OTHER PUBLICATIONS

International Search Report and Written Opinion, Application No. PCT/EP2011/058838, 18 pages, Sep. 13, 2011.

(Continued)

*Primary Examiner* — Erick Solis
(74) *Attorney, Agent, or Firm* — Slayden Grubert Beard PLLC

(57) ABSTRACT

A method for controlling a valve including a spring, an actuator having an actuator force opposing the spring, and a pin actuatable by the actuator. To open the valve, in a first operating mode a current having a predefined curve is applied to the actuator, starting from a starting value of the current at which the pin is positioned to allow the valve to close, measured values of the current are determined chronologically sequentially, a reference value of the current takes on the current measured value of the current when the measured current deviates from the applied current by a predefined degree. In a second operating mode, a current having a predefined curve is applied to the actuator, starting with the starting value of the current to a final value of the current at which the pin is in a position that prevents the valve from closing.

12 Claims, 2 Drawing Sheets

(51) Int. Cl.
*F02D 41/20* (2006.01)
*F02D 41/38* (2006.01)

(52) U.S. Cl.
CPC .... *F02D 41/3845* (2013.01); *F02D 2041/2027* (2013.01); *F02D 2041/2037* (2013.01); *F02D 2041/2055* (2013.01); *F02D 2041/2058* (2013.01); *F02D 2250/14* (2013.01)

(56) References Cited

U.S. PATENT DOCUMENTS

| | | | | |
|---|---|---|---|---|
| 5,959,825 A * | 9/1999 | Harcombe | | 361/154 |
| 6,128,175 A * | 10/2000 | Wright et al. | | 361/154 |
| 6,285,151 B1 * | 9/2001 | Wright et al. | | 318/560 |
| 6,373,678 B1 * | 4/2002 | Bartsch et al. | | 361/160 |
| 6,483,689 B1 * | 11/2002 | Koch et al. | | 361/160 |
| 6,546,903 B2 * | 4/2003 | Taniguchi et al. | | 123/90.11 |
| 6,560,088 B1 * | 5/2003 | Beck et al. | | 361/154 |
| 6,741,441 B2 * | 5/2004 | Hilbert et al. | | 361/160 |
| 7,054,128 B2 * | 5/2006 | Fuwa | | 361/152 |
| 7,930,089 B2 | 4/2011 | Askew | | 701/104 |
| 8,038,122 B2 * | 10/2011 | Gelez et al. | | 251/129.04 |
| 8,166,953 B2 | 5/2012 | Caley | | 123/490 |
| 8,239,115 B2 * | 8/2012 | Ascher et al. | | 701/103 |
| 2005/0066940 A1 | 3/2005 | Sheikh et al. | | 123/446 |
| 2006/0201488 A1 | 9/2006 | Kohler et al. | | 123/479 |
| 2012/0000445 A1 * | 1/2012 | Borg et al. | | 123/497 |
| 2012/0118271 A1 * | 5/2012 | Borg et al. | | 123/495 |

FOREIGN PATENT DOCUMENTS

| | | | | |
|---|---|---|---|---|
| DE | 102008002901 A1 | 1/2009 | | F02M 51/00 |
| EP | 2060763 A2 | 5/2009 | | F02D 41/20 |
| GB | 2377025 A | 12/2002 | | F01L 9/04 |
| JP | 5272392 A | 10/1993 | | F02D 41/14 |
| JP | 2007/507646 A | 3/2007 | | F02D 41/20 |
| WO | 2007/090228 A1 | 8/2007 | | F02D 41/30 |
| WO | 2011/151288 A1 | 12/2011 | | F02D 41/20 |

OTHER PUBLICATIONS

German Office Action, Application No. 10 2010 022 536.3, 3 pages, Jan. 20, 2012.
Chinese Office Action, Application No. 201180038050.3, 12 pages, Nov. 4, 2014.

* cited by examiner

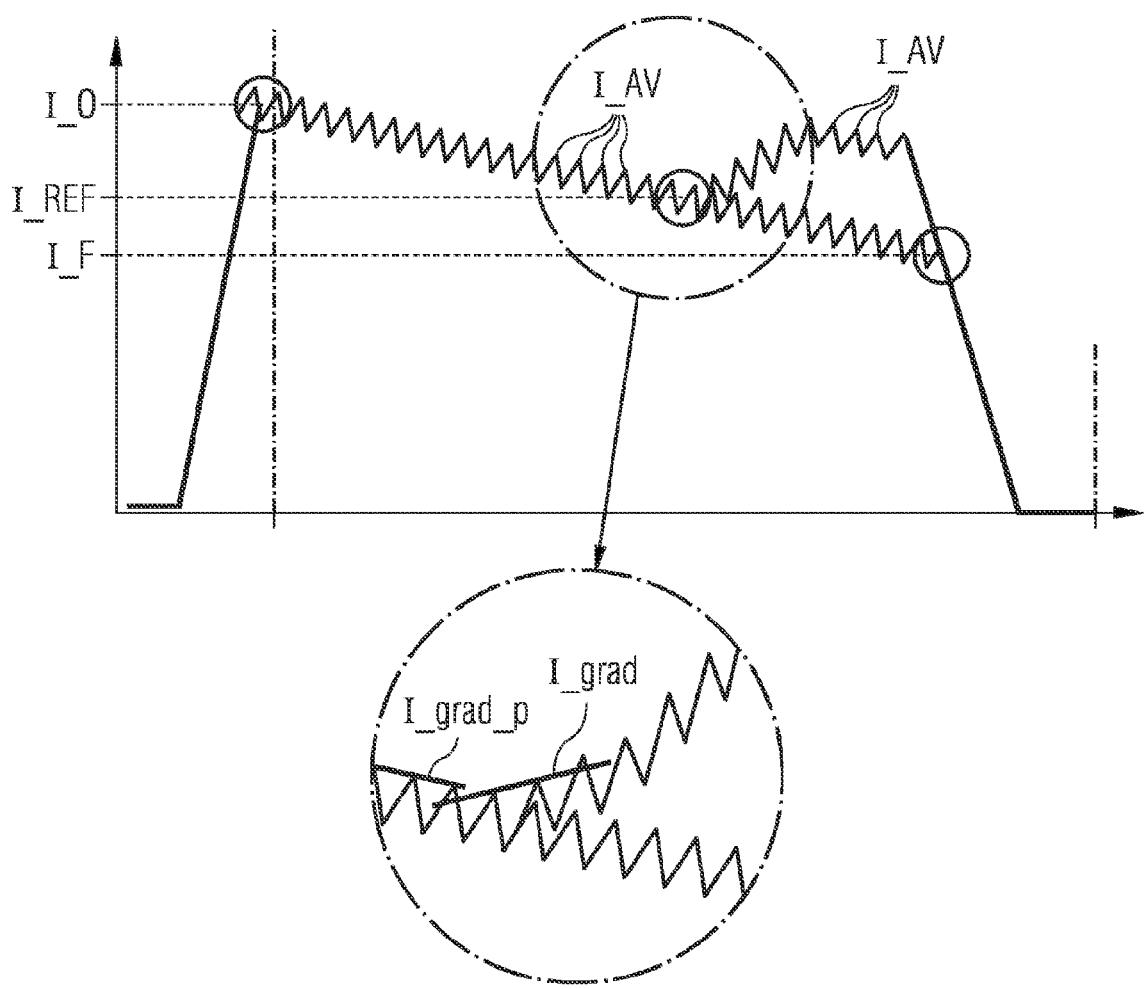

METHOD AND DEVICE FOR CONTROLLING A VALVE

CROSS-REFERENCE TO RELATED APPLICATIONS

This application is a U.S. National Stage Application of International Application No. PCT/EP2011/058838 filed May 30, 2011, which designates the United States of America, and claims priority to DE Application No. 10 2010 022 536.3 filed Jun. 2, 2010, the contents of which are hereby incorporated by reference in their entirety.

TECHNICAL FIELD

The disclosure relates to a method and a device for controlling a valve.

BACKGROUND

Valves may be used in a high pressure pump to feed fluid for a common rail injection system for internal combustion engines of motor vehicles.

Such valves may be subject to heavy loading, in particular if they are subjected to continuous loading such as, for example, in high pressure pumps. Since high pressure pumps may be subjected to pressures of, for example, 2000 bar or more, stringent requirements are placed on the valves in such pumps. Noise can occur both during the closing and during the opening of these valves.

SUMMARY

In one embodiment, a method is provided for controlling a valve which has a spring having a spring force, an actuator having an actuator force which counteracts the spring force, and a pin which can be actuated by means of the actuator, wherein in order to open the valve in a first operating mode: a current having a predefined, nonconstant profile is applied to the actuator starting from an initial value of the current at which the pin is in a position in which it permits the valve to close, measured values of the current are determined in a chronological sequence, a reference value of the current assumes the present measured value of the current as soon as the profile of the measured values of the current deviates to a predefined extent from the profile of the current which is applied to the actuator, wherein the reference value of the current is representative of the fact that the actuator force is equal to the spring force; and wherein in a second operating mode, a current having a predefined nonconstant profile is applied to the actuator starting from the initial value of the current up to a final value of the current, wherein the reference value lies between the initial value and the final value of the current, and at the final value of the current the pin is in a position in which it does not permit the value to close.

In a further embodiment, in the first operating mode a current having a predefined linear profile is applied to the actuator, a present value of a change in the current over time is determined as a function of two successive measured values of the current, the reference value of the current assumes the present measured value of the current as soon as the present value of the change in the current over time deviates to a predefined extent from a preceding value of the change in the current over time, and wherein in the second operating mode a current having a predefined linear profile is applied to the actuator.

In a further embodiment, the spring is designed to open the valve, wherein in the first operating mode the applied current decreases linearly starting from the initial value of the current, and for the initial value of the current the actuator force is greater than the spring force, and in which in the second operating mode the applied current decreases linearly starting from the initial value of the current, and the final value is smaller than the reference value.

In a further embodiment, the applied current is set as a function of a pulse width modulation. In a further embodiment, points in time for determining the measured values of the current are dependent on points in time of maximum values of the pulse-width-modulated current.

In a further embodiment, a frequency of the pulsewidth modulation is dependent on points in time for determining the measured values of the current. In a further embodiment, the measured values of the current are determined as a function of a voltage at a shunt resistor. In a further embodiment, the reference value of the current is determined as a function of a temperature of a fluid in the valve or in a predefined region of the valve. In a further embodiment, the valve is arranged in an injection system of an internal combustion engine, and the reference value of the current is determined as a function of characteristic values of the internal combustion engine. In a further embodiment, the reference value of the current is stored in an operating-point-dependent characteristic diagram. In a further embodiment, the initial value of the current and the final value of the current are predefined in such a way that the reference value of the current is the arithmetic mean of the initial value and of the final value.

In another embodiment, a device is provided for controlling a valve which has a spring having a spring force, an actuator having an actuator force which counteracts the spring force, and a pin which can be actuated by means of the actuator, wherein the device is designed, in a first operating mode, to apply a current having a predefined nonconstant profile to the actuator starting from an initial value of the current at which the pin is in a position in which it permits the valve to close, to determine chronologically successive measured values of the current, to assume the present measured value of the current by means of a reference value of the current as soon as the profile of the measured values of the current deviates to a predefined extent from the profile of the current which is applied to the actuator, wherein the reference value of the current is representative of the fact that the actuator force is equal to the spring force, and in a second operating mode, to apply a current having a predefined nonconstant profile to the actuator starting from the initial value up to a final value of the current, wherein the reference value lies between the initial value and the final value of the current, and at the final value of the current the pin is in a position in which it does not permit the valve to close.

BRIEF DESCRIPTION OF THE DRAWINGS

Example embodiments of the disclosure are explained in more detail below with reference to schematic drawings, in which:

FIG. 4 shows a schematic view of current profiles during the control of the valve.

DETAILED DESCRIPTION

Figure 1:
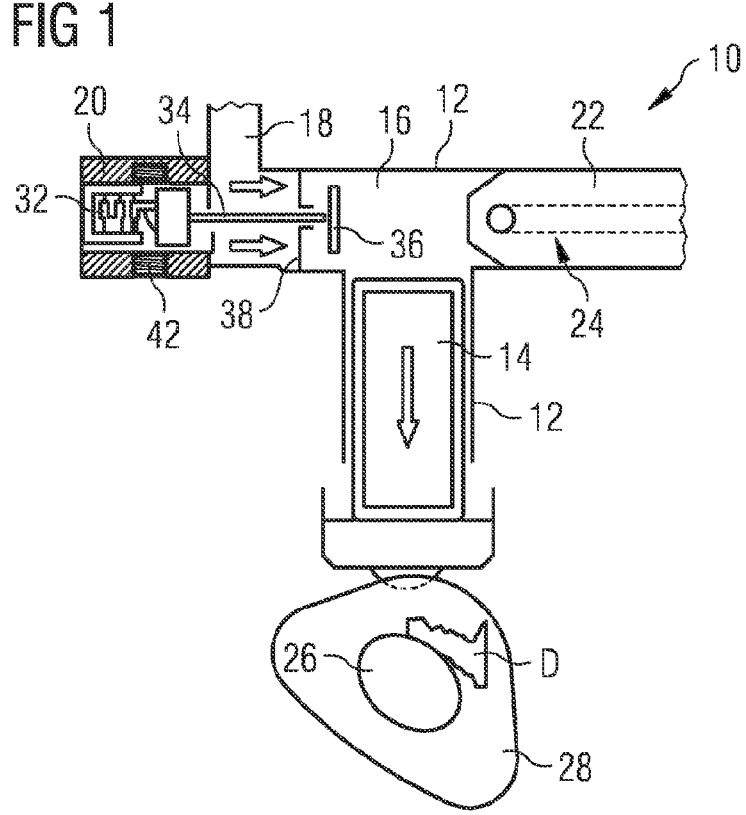
FIG. 1 shows a schematic view of a pump having a valve in a longitudinal section.

Embodiments of the present disclosure provide a method and a device for controlling a valve with which precise and cost-effective operation of the valve is made possible.

For example, some embodiments provide a method and a corresponding device for controlling a valve. The valve has a spring having a spring force, an actuator having an actuator force which counteracts the spring force, and a pin which can be actuated by means of the actuator.

In order to open the valve, in a first operating mode a current having a predefined nonconstant profile is applied to the actuator starting from an initial value of the current at which the pin is in a position in which it permits the valve to close. Measured values of the current are determined in a chronological sequence, a reference value of the current assumes the present measured value of the current as soon as the profile of the measured values of the current deviates to a predefined extent from the profile of the current which is applied to the actuator. The reference value of the current is representative of the fact that the actuator force is equal to the spring force. In a second operating mode, a current having a predefined nonconstant profile is applied to the actuator starting from the initial value of the current up to a final value of the current. The reference value lies between the initial value and the final value of the current. At the final value of the current, the pin is in a position in which it does not permit the valve to close.

The deviation, to a predefined extent, of the profile of the measured values of the current from the profile of the current which is applied to the actuator means that a difference between the measured value of the current and the value of the applied current exceeds a predefined threshold value.

This may allow the valve to be opened slowly in such a way that the generation of noise by the valve can be kept small and nevertheless reliable and sufficiently fast opening of the valve can be brought about. Furthermore, wear on the valve can be kept small. Furthermore, a cost-effective design of the valve is possible.

In one embodiment, in the first operating mode a current having a predefined linear profile is applied to the actuator, a present value of a change in the current over time is determined as a function of two successive measured values of the current, a reference value of the current assumes the present measured value of the current as soon as the present value of the change in the current over time deviates to a predefined extent from a preceding value of the change in the current over time, and in the second operating mode a current having a predefined linear profile is applied to the actuator.

The deviation, to a predefined extent, of the present value of the change in the current over time from one of the preceding values of the change in the current over time means that a difference of the present value of the change in the current over time from one of the preceding values of the change in the current over time exceeds a predefined threshold value.

In a further embodiment, the spring is designed to open the valve. In the first operating mode, the applied current decreases linearly starting from the initial value of the current. For the initial value of the current, the actuator force is greater than the spring force. In the second operating mode, the applied current decreases linearly starting from the initial value of the current, and the final value is smaller than the reference value. The generation of noise of a valve which is open when currentless may thereby be kept small and reliable and chronologically appropriate opening of the valve which is open when currentless can be brought about. Furthermore, the wear on the valve which is open and currentless can be kept small.

In a further embodiment, the applied current is set as a function of a pulse width modulation. The applied current can thus be set in a very easy way.

In a further embodiment, points in time for determining the measured values of the current are dependent on points in time of maximum values of the pulse-width-modulated current. The determination of a value of a change in the current over time as a function of two successive measured values of the current can thus be ensured in a very easy way.

In a further embodiment, a frequency of the pulse width modulation is dependent on points in time for determining the measured values of the current. The points in time for determining the measured values of the current can thus be predefined in accordance with the requirements for the measurement, and the frequency of the pulse width modulation can be adapted to these measured values, with the result that, for example, the points in time of the maximum values of the pulse-width-modulated current can correspond to the points in time for determining the measured values of the current.

In a further embodiment, the measured values of the current are determined as a function of a voltage at a shunt resistor. This constitutes a particularly simple possibility for reliably measuring the current.

In a further embodiment, the reference value of the current is determined as a function of a temperature of a fluid in the valve or in a predefined region of the valve. Reference values of the current can be determined under various, in particular temperature-dependent, operating conditions of the valve.

In a further embodiment, the valve is arranged in an injection system of an internal combustion engine, and the reference value of the current is determined as a function of characteristic values of the internal combustion engine. Reference values of the current can be determined under different operating conditions of the internal combustion engine.

In a further embodiment, the reference value of the current is stored in an operating-point-dependent characteristic diagram. The reference values of the current can be stored for various operating conditions of the valve or of the internal combustion engine, in particular within the scope of the first operating mode, and can be applied for the respectively present operating state of the valve or of the internal combustion engine during the second operating mode.

In a further embodiment, the initial value of the current and the final value of the current are predefined in such a way that the reference value of the current is the arithmetic mean of the initial value and of the final value. The reference value of the current very reliably lies in the centre between the initial value, for which the actuator force is greater than the spring force, and the final value, for which the valve is just opened. This permits very robust control of the valve.

FIG. 1 shows a pump 10 having a pump housing 12. The pump 10 is embodied, in particular, as a high pressure pump, e.g., as a radial piston pump. A pump piston 14 is movably mounted in the pump housing 12. In the pump housing 12 there is a pressure space 16 at one end of the pump piston 14. In order to be able to fill the pressure space 16 with fluid, said pressure space 16 has a feed line 18 in which a valve 20 which is embodied as an inlet valve may be arranged. The valve 20 which is embodied as an inlet valve may be embodied as a digitally switched valve. The valve 20 facilitates the filling of the pressure space 16 and prevents the flowing back of the fluid out of the feed line 18 during the filling. The pressure space 16 also has a discharge line 22 in which a further valve 24 which is embodied as an outlet valve is arranged. In this way, fluid can be expelled from the pressure space 16.

The pump 10 also has a drive shaft 26 which is operatively connected to an eccentric ring 28 and can be rotated in the clockwise direction in a rotational direction D. Instead of the eccentric ring 28, a cam shaft can also be used. Alternatively, the pump 10 can also be embodied as a crank drive pump.

Figure 2:
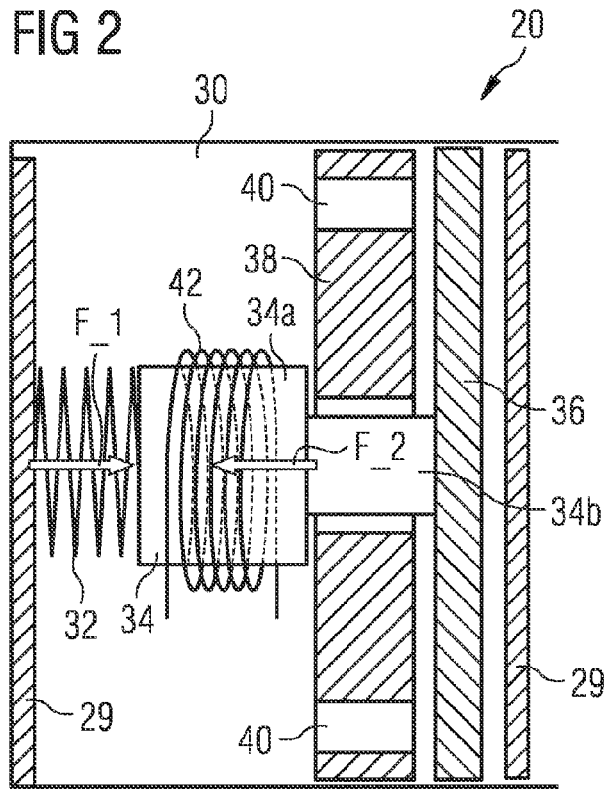
FIG. 2 shows a schematic view of the valve in a longitudinal section.

FIG. 2 shows the valve 20 having a valve housing 29 which has a recess 30. Arranged in the recess 30 are a spring 32, a pin 34 and a sealing element 36. The spring 32 prestresses the sealing element 36 via the pin 34 in that it is supported on a wall of the recess 30. The pin 34 has a first cylindrical part 34a and a second cylindrical part 34b, wherein the first part 34a has a larger diameter than the second part 34b.

In the recess 30 there is also a sealing seat 38 which is fixedly arranged with respect to the valve housing 29 and which has cutouts 40. Fluid can flow via the cutouts 40 if the sealing element 36 is not bearing against the sealing seat 38.

The valve 20 also has an actuator 42 which is embodied, in particular, as a solenoid. The first part 34a of the pin 34 is arranged inside the actuator 42 and can be actuated by the actuator 42.

Figure 3:
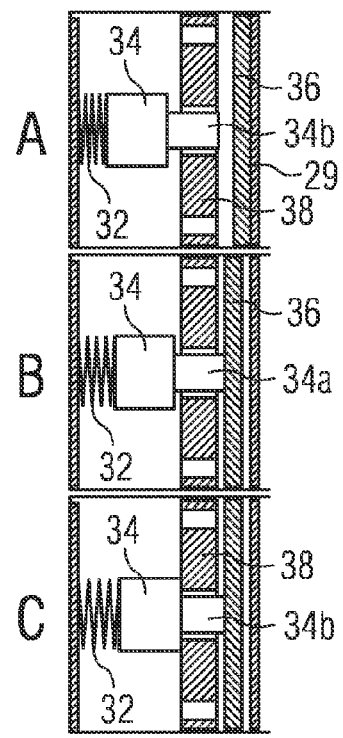
FIG. 3 shows a schematic view of the valve in three operating states.

In the text which follows, the method of functioning of the pump 10 and of the valve 20 will be described:

By means of a rotational movement of the drive shaft 26 in a rotational direction D, the pump piston 14 is moved toward the drive shaft 26 by means of the eccentric ring 28 until said pump piston 14 reaches a bottom dead centre. In this context, the valve 20 opens owing to a spring force $F\_1$ of the spring 32 and the pressure difference upstream and downstream of the valve 20. The sealing element 36 lifts off from the sealing seat 38 (FIG. 3). The pressure space 16 is now filled with fluid. As a result of a further rotational movement of the drive shaft 26 in the rotational direction D, the pump piston 14 is moved by the eccentric ring 28 away from the drive shaft 26 and in so doing seals the fluid located in the pressure space 16. At a predefined point in time, the valve 20 is closed by a current being applied to the actuator 42, as a result of which an actuator force $F\_2$ which counteracts the spring force $F\_1$ can act on the pin 34. As a result of the movement of the pin 34 in the direction of the actuator force $F\_2$ and the prevailing pressure conditions upstream and downstream of the valve 20, the sealing element 36 can come to bear against the sealing seat 38 and a flow of fluid through the cutouts 40 is prevented. The fluid which is compressed in the pressure space 16 can now be expelled completely from the pump 10 via the further valve 24 which is embodied as an outlet valve. The pump piston 14 has now reached a top dead centre.

If the pump 10 is a high-pressure fuel pump of an injection system of an internal combustion engine, the fuel to which high pressure is applied can arrive at a fluid accumulator, embodied as a high-pressure fuel accumulator, referred to as a common rail.

Both during the opening and during the closing of the valve 20, it is possible for noise to occur at the valve 20 owing to mechanical and hydraulic causes. The noise which occurs during the opening of the valve 20 is described below with reference to FIG. 3. During the opening of the valve, in a first step the sealing element 36 comes into abutment with the valve housing 29 (FIG. 3A), as a result of which a first noise can occur. After the contact with the valve housing 29, the sealing element 36 can move back in the direction of the pin 34, while the pin 34 for its part is moved toward the sealing element 36 by the spring force $F\_1$ of the spring 32. If the sealing element 36 and the part 34a of the pin 34 impact against one another, a further noise can occur (FIG. 3B). In the text which follows, the pin 34 is moved against the sealing seat 38 via the spring force $F\_1$ of the spring 32. If the part 34b of the pin 34 impacts against the sealing seat 38, a further noise can occur (FIG. 3C).

In the text which follows, the control of the valve 20 is illustrated in detail for a valve which is open when currentless (FIG. 4). Of course, this can be applied in a corresponding way to a valve which is closed when currentless.

In order to open the valve 20, in a first operating mode a current having a predefined profile is applied to the actuator 42. The first operating mode can also be referred to as the detection mode. The applied current decreases starting from an initial value $I\_0$. For the initial value $I\_0$ of the current, the actuator force $F\_2$ is greater than the spring force $F\_1$. As a result, the pin 34 is pressed in the direction of the spring 32 counter to the spring force $F\_1$. The valve 20 can be closed in this state. If the valve 20 is arranged in the pump 10, the applied current assumes the initial value $I\_0$ when the pump piston 14 reaches the top dead centre.

The high-resolution illustration of the profile of the current in FIG. 4 also shows fluctuations in the current due to a pulse width modulation. However, basically the profile of the current is to be understood as being linear, and only the comparatively very small fluctuations of the pulse width modulation are superimposed on the linear profile of the current.

In the text which follows, measured values $I\_AV$ of the current are determined in a chronological sequence. A present value $I\_grad$ of a change in the current over time is determined as a function of two successive measured values $I\_AV$ of the current. The current is reduced in a linear fashion until the present value $I\_grad$ of the change in the current over time deviates to a predefined extent from a preceding value $I\_grad\_p$ of the change in the current over time, that is to say the deviation between the present value $I\_grad$ of the change in the current over time from the preceding value $I\_grad\_p$ of the change in the current over time exceeds a predefined threshold value. Such a situation is illustrated in the enlarged detail of FIG. 4, wherein the present value $I\_grad$ of the change in the current over time achieves a positive value here, while the preceding value $I\_grad\_p$ of the change in the current over time has a negative value. The changing of the value $I\_grad$ of the change in the current over time with respect to the preceding values $I\_grad\_p$ of the change in the current over time is caused by induction of a counter current in the actuator 42 owing to a movement of the pin 34 in the direction of the spring force $F\_1$. A reference value $I\_REF$ of the current then assumes the present measured value $I\_AV$ of the current. The reference value $I\_REF$ of the current is representative of the fact that the actuator force $F\_2$ is equal to the spring force $F\_1$.

The applied current may be set as a function of a pulse width modulation. In particular, points in time for determining the measured values $I\_AV$ of the current may be dependent on points in time of the maximum values of the pulse-width-modulated current. The value $I\_grad$ of the change in the current over time can be determined in this case from the difference between two successive peak values of the pulse-width-modulated current, as is shown, in particular, in FIG. 4.

The frequency of the pulse width modulation can be adapted to the desired point in time for determining the measured values $I\_AV$ of the current. This makes it possible, in particular, to adapt the distance between the maximum values of the pulse-width-modulated current to the desired measuring points for determining the measured values $I\_AV$ of the current.

The measured values $I\_AV$ of the current may be determined by a voltage measurement at a shunt resistor.

The first operating mode, which is referred to as a detection mode, can be carried out, in particular, as a function of ambient conditions such as the temperature of the valve 20 or a temperature of a fluid in the valve 20 or as a function of characteristic values of the internal combustion engine such as, for example, the rotational speed or the running time of the internal combustion engine. The storage of the reference values I_REF of the current, which are determined for the various operating states of the valve 20 or of the internal combustion engine, can be carried out by storing in an operating-point-dependent characteristic diagram. As a result, the reference values I_REF of the current can be stored for various operating conditions of the valve 20 or of the internal combustion engine within the scope of the first operating mode.

In a second operating mode, which is also referred to as a working mode, the current having a predefined profile is applied to the actuator 42. The current again decreases linearly starting from the initial value I_0 at which the actuator force F_2 is greater than the spring force F_1. The linear decrease in the current now occurs up to a final value I_F of the current. The final value I_F of the current is smaller than the reference value I_REF. If the valve 20 is arranged in the pump 10, the applied current assumes the final value I_F when the pump piston 14 is near to the bottom dead centre.

The final value I_F is representative of the fact that the pin 34 is in a position in which it does not permit the valve 20 to close. In other words, this means that the spring force F_1 is only slightly greater than the actuator force F_2. The pin 34 can come into contact with the sealing element 36 in a gentle way and therefore secure the position of the sealing element 36 with respect to the sealing seat 38, as a result of which the valve 20 can be effectively held open. As a result of the slow movement of the pin 34, the generation of noise by the valve 20 can be kept very small and the valve 20 can nevertheless be opened reliably and sufficiently fast. Furthermore, as a result of the slow movement of the pin 34 the wear on the valve 20 can be kept low.

The initial value I_0 of the current and the final value I_F of the current may be predefined in such a way that the reference value I_REF of the current lies centrally between the initial value I_0 and the final value I_F. This makes very robust control of the valve 20 possible. In particular, the reference value I_REF can be positioned relative to the initial value I_0 and the final value I_F of the current by adapting the pulse duty ratio of the pulse-width-modulated current in a corresponding way. In particular, the reference value I_REF of the current can be adapted by adapting the gradient of the current profile from the initial value I_0 of the current to the final value I_F of the current.

What is claimed is:

1. A method for controlling a valve including a spring having a spring force, an actuator having an actuator force that counteracts the spring force, and a pin that is actuatable by the actuator, the method comprising:
   in a first operating mode:
      applying a current having a predefined, nonconstant profile to the actuator starting from an initial value of the current at which the pin is in a position that permits the valve to close,
      determining measured values of the current in a chronological sequence,
      upon a profile of the measured values of the current deviating from the profile of the current applied to the actuator by a predefined extent, a reference value of the current assuming a present measured value of the current, wherein the reference value of the current corresponds to the actuator force being equal to the spring force, and
   in a second operating mode, applying a current having a predefined nonconstant profile to the actuator starting from the initial value of the current up to a final value of the current, wherein the reference value lies between the initial value and the final value of the current, and at the final value of the current the pin is in a position that does not permit the value to close.

2. The method of claim 1, wherein in the first operating mode:
   a current having a predefined linear profile is applied to the actuator,
   a present value of a change in the current over time is determined as a function of two successive measured values of the current, and
   the reference value of the current assumes the present measured value of the current upon the present value of the change in the current over time deviating by a predefined extent from a preceding value of the change in the current over time, and
   wherein in the second operating mode a current having a predefined linear profile is applied to the actuator.

3. The method of claim 1,
   wherein the spring is designed to open the valve,
   wherein in the first operating mode the applied current decreases linearly starting from the initial value of the current, and for the initial value of the current the actuator force is greater than the spring force, and
   wherein in the second operating mode, the applied current decreases linearly starting from the initial value of the current, and the final value is smaller than the reference value.

4. The method of claim 1, wherein the applied current is set as a function of a pulse width modulation.

5. The method of claim 4, wherein points in time for determining the measured values of the current are dependent on points in time of maximum values of the pulse-width-modulated current.

6. The method as claimed in claim 4, wherein a frequency of the pulsewidth modulation is dependent on points in time for determining the measured values of the current.

7. The method of claim 1, wherein the measured values of the current are determined as a function of a voltage at a shunt resistor.

8. The method of claim 1, wherein the reference value of the current is determined as a function of a temperature of a fluid in the valve or in a predefined region of the valve.

9. The method claim 1, wherein the valve is arranged in an injection system of an internal combustion engine, and the reference value of the current is determined as a function of characteristic values of the internal combustion engine.

10. The method of claim 1, wherein the reference value of the current is stored in an operating-point-dependent characteristic diagram.

11. The method of claim 1, wherein the initial value of the current and the final value of the current are predefined such that the reference value of the current is the arithmetic mean of the initial value and of the final value.

12. A device for controlling a valve including a spring having a spring force, an actuator having an actuator force that counteracts the spring force, and a pin that is actuatable by the actuator, wherein the device comprises:
   control instructions stored in the non-transitory computer readable media and executable to:
      in a first operating mode, apply a current having a predefined nonconstant profile to the actuator starting from an initial value of the current at which the pin is in a position in which it permits the valve to close, determine chronologically successive measured values of the current, wherein upon a profile of the measured values of the current deviating from the profile of the current applied to the actuator by a predefined extent, a reference value of the current assumes a present measured value of the current, wherein the reference value of the current corresponds to the actuator force being equal to the spring force, and in a second operating mode, apply a current having a predefined nonconstant profile to the actuator starting from the initial value up to a final value of the current, wherein the reference value lies between the initial value and the final value of the current, and at the final value of the current the pin is in a position in which it does not permit the valve to close.

* * * * *